United States Patent [19]
Yuill et al.

[11] Patent Number: 5,083,501
[45] Date of Patent: Jan. 28, 1992

[54] VENTILATION WINDOW UNIT

[75] Inventors: Grenville K. Yuill; Daniel E. Friesen; Gordon M. Comeau, all of Winnipeg, Canada

[73] Assignee: Willmar Windows Industries Ltd., Winnipeg, Canada

[21] Appl. No.: 487,264

[22] Filed: Mar. 2, 1990

[51] Int. Cl.$^5$ .................................................. E06B 7/02
[52] U.S. Cl. .................................. 454/212; 454/196; 454/227; 454/340
[58] Field of Search .................. 98/88.1, 90, 95, 96, 98/97, 98

[56] References Cited

U.S. PATENT DOCUMENTS

| | | | |
|---|---|---|---|
| 364,734 | 6/1887 | Smith | 98/97 |
| 2,936,694 | 5/1960 | Josephson | 98/98 |
| 3,793,931 | 2/1974 | Wild | 98/95 |
| 4,295,417 | 10/1981 | Isley | 98/88.1 X |
| 4,331,066 | 5/1982 | Schmidlin | 98/96 |
| 4,505,259 | 3/1985 | Seppanen et al. | 126/429 |

FOREIGN PATENT DOCUMENTS

| | | | |
|---|---|---|---|
| 2702214 | 7/1978 | Fed. Rep. of Germany | 98/96 |
| 44738 | 3/1985 | Japan | 98/88.1 |
| 79916 | 3/1952 | Norway | 98/88.1 |

OTHER PUBLICATIONS

Brochure-"The Air Curtain Window", by Ekono Windo Company.

Primary Examiner—Harold Joyce
Attorney, Agent, or Firm—Adrian D. Battison; Stanley G. Ade; Murray E. Thrift

[57] ABSTRACT

A window unit is provided for reducing heat loss through the window while at the same time providing a desirable inflow of prewarmed ventilation air to maintain interior air quality and thermal comfort. The window unit comprises an outer window frame and a sash frame designed to support an inner dual pane sealed window unit together with a separate outer single pane thus providing a triple pane action. The sash frame is also modified to provide a slot at the lower edge for entry of exterior air into a channel defined between the outer pane and the outer surface of the sealed window unit. The building is maintained at reduced pressure to cause air to flow in a laminar action along the channel toward a slot above the top of the sealed window unit so that heat escaping from the outer pane of the sealed window unit is carried by the laminar air flow back through the upper slot and into the interior of the building. A control unit including a manually actuable damper, a back draft damper and a nozzle is arranged at the upper slot to direct the air toward the ceiling.

20 Claims, 3 Drawing Sheets

VENTILATION WINDOW UNIT

This invention relates to a window unit for mounting in an exterior wall of a building for providing ventilation and for providing a high level of insulation effect.

In climates where there is a significant difference in temperature between the interior and exterior of the building it is of course highly desirable to provide a high level of insulation between the interior and exterior both in the walls of the building and also in any windows that are provided in the building. Though their performance has improved dramatically in recent years, windows still constitute a weak link in the insulation system and can have a significantly lower insulation value than the surrounding walls.

At the same time as attention has been given to improving or increasing the insulation value of walls and windows, further attention has been given to sealing the building construction against air infiltration since air infiltration is of course a further source of energy transmission or energy loss from the building to the exterior. The effective techniques adopted for preventing air infiltration have led to a situation. Where ventilation rates have fallen so low that the quality of air within the building can become unsatisfactory or even damaging to the occupants.

Proposals have been made for heat exchange units which centrally draw air into the building, pass the cold air adjacent an exhaust of stale heated air to extract heat from the exhaust air and inject the fresh air into the central air system of the building for transmission to the various rooms of the building. These devices have achieved some success and when used in conjunction with triple pane sealed window unit windows have to date constituted the best efficiency energy systems for use in a building.

However the triple pane window is still significantly lower in insulation value than the surrounding walls and therefore constitutes an area of reduced efficiency. In addition the central heat exchange system requires that the building use a central air system which can be significantly more expensive than base board heating systems which do not provide air movement throughout the building.

A Finish company Ekono Oy have developed an improved window system which includes a plurality of solar energy absorbing blinds positioned between an inner pane assembly of the window and an outer pane assembly. The device then acts to draw preferably room air into the interior between the two panes to collect or extract the heat energy from the blinds and then to transmit that heat energy from the interior of the window to a central air transmission unit. The windows are therefore intended to act as an active solar collector. In addition the window known as the "air curtain window" transmits the air through the window system to carry heat from the solar collection system into the building. A brochure of the company states that the "air curtain windows" do not prove to be cost-effective in residential application.

The window system is intended also in some cases to allow the injection of some exterior air in the channel between the panes so as to assist in controlling the heat application to the interior of the building. Some details of the window system are shown in a brochure and in addition U.S. Pat. No. 4,505,259 (Seppanen) assigned to this company shows some further details of the device.

However the window system proposed above is highly complex and expensive and is not intended specifically to reduce heat loss through the window nor to provide ventilation to the interior of the building but is intended more as an active solar energy collector using a system which is basically uneconomical in most applications.

SUMMARY OF THE INVENTION

It is one object of the present invention, therefore, to provide an improved window construction which exhibits high insulation value and also automatically provides a ventilation system for the entry into the building of sufficient levels of air flow for maintaining adequate air quality.

According to the first aspect of the invention there is provided a window construction comprising a window frame for mounting in a window opening of a building so as to separate the exterior of the building from the interior of the building, an inner window pane assembly mounted in the window frame and extending across an area of the window frame, an outer window pane assembly mounted in the window so as to cover substantially the same area of the window frame and extending parallel to the inner window frame assembly so as to define a channel of substantially constant cross-section between an outer surface of the inner pane assembly and an inner surface of the outer pane assembly, first opening means along one edge of the window frame allowing communication of air from the exterior of the building into the channel, second opening means along an edge of the window frame opposed to said one edge allowing communication of air from the channel into the interior of the building, the first and second opening means and the channel being arranged to generate a substantially laminar flow of air through the channel so as to carry heat escaping from the outer surface of the inner pane assembly through the channel to the interior of the building while substantially preventing the heat from reaching the outer pane assembly.

According to a second aspect of the invention there is provided a window construction comprising a window frame for mounting in a window opening of a building so as to separate the exterior of the building from the interior of the building, an inner window pane assembly mounted in the window frame and extending across an area of the window frame, an outer window pane assembly mounted in the window so as to cover substantially the same area of the window frame and extending parallel to the inner window frame assembly so as to define a channel of substantially constant cross-section between an outer surface of the inner pane assembly and an inner surface of the outer pane assembly, first opening means along one edge of the window frame allowing communication of air from the exterior of the building into the channel, second opening means along an edge of the window frame opposed to said one edge allowing communication of air from the channel into the interior of the building, the first opening means being arranged at a bottom edge of the window frame and the second opening means being arranged at the top edge of the window frame, and airflow control means mounted on the frame at the second opening means for controlling the flow of air from the channel into the interior of the building, the control unit including a guide nozzle for directing air inwardly and upwardly from the second opening means.

According to a third aspect of the invention there is provided a building construction comprising wall means defining a barrier between an interior of the building and an exterior of the building, ventilation fan means generating an air flow from the interior of the building to the exterior of the building through duct means for reducing the pressure in the interior relative to the pressure on the exterior of the building and at least one window frame mounted in a window opening of the wall means of the building so as to separate the exterior of the building from the interior of the building, an inner window pane assembly mounted in the window frame and extending across an area of the window frame, an outer window pane assembly mounted in the window so as to cover substantially the same area of the window frame and extending parallel to the inner window frame assembly so as to define a channel of substantially constant cross-section between an outer surface of the inner pane assembly and an inner surface of the outer pane assembly, first opening means along one edge of the window frame allowing communication of air from the exterior of the building into the channel, second opening means along an edge of the window frame opposed to said one edge allowing communication of air from the channel into the interior of the building, and nozzle means for directing the air from the channel freely into the interior of the building from said second means.

According to a fourth aspect of the invention there is provided a method of providing ventilation into the interior of a building comprising extracting air from the building so as to define within the building a reduced pressure relative to the exterior of the building, providing a plurality of window units each comprising a window frame for mounting in a window opening of a building so as to separate the exterior of the building from the interior of the building, an inner window pane assembly mounted in the window frame and extending across an area of the window frame, an outer window pane assembly mounted in the window so as to cover substantially the same area of the window frame and extending parallel to the inner window frame assembly so as to define a channel of substantially constant cross-section between an outer surface of the inner pane assembly and an inner surface of the outer pane assembly, first opening means along one edge of the window frame allowing communication of air from the exterior of the building into the channel, second opening means along an edge of the window frame opposed to said one edge allowing communication of air from the channel into the interior of the building, generating a substantially laminar flow of air through the channel so as to carry heat escaping from the outer surface of the inner pane assembly through the channel, while substantially preventing the heat from reaching the outer pane assembly, to the interior of the building such that each separate window unit provides a separate flow of exterior air into the building, the exterior air being warmed by the escape of heat through the inner pane assembly.

With the foregoing in view, and other advantages as will become apparent to those skilled in the art to which this invention relates as this specification proceeds, the invention is herein described by reference to the accompanying drawings forming a part hereof, which includes a description of the best mode known to the application and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
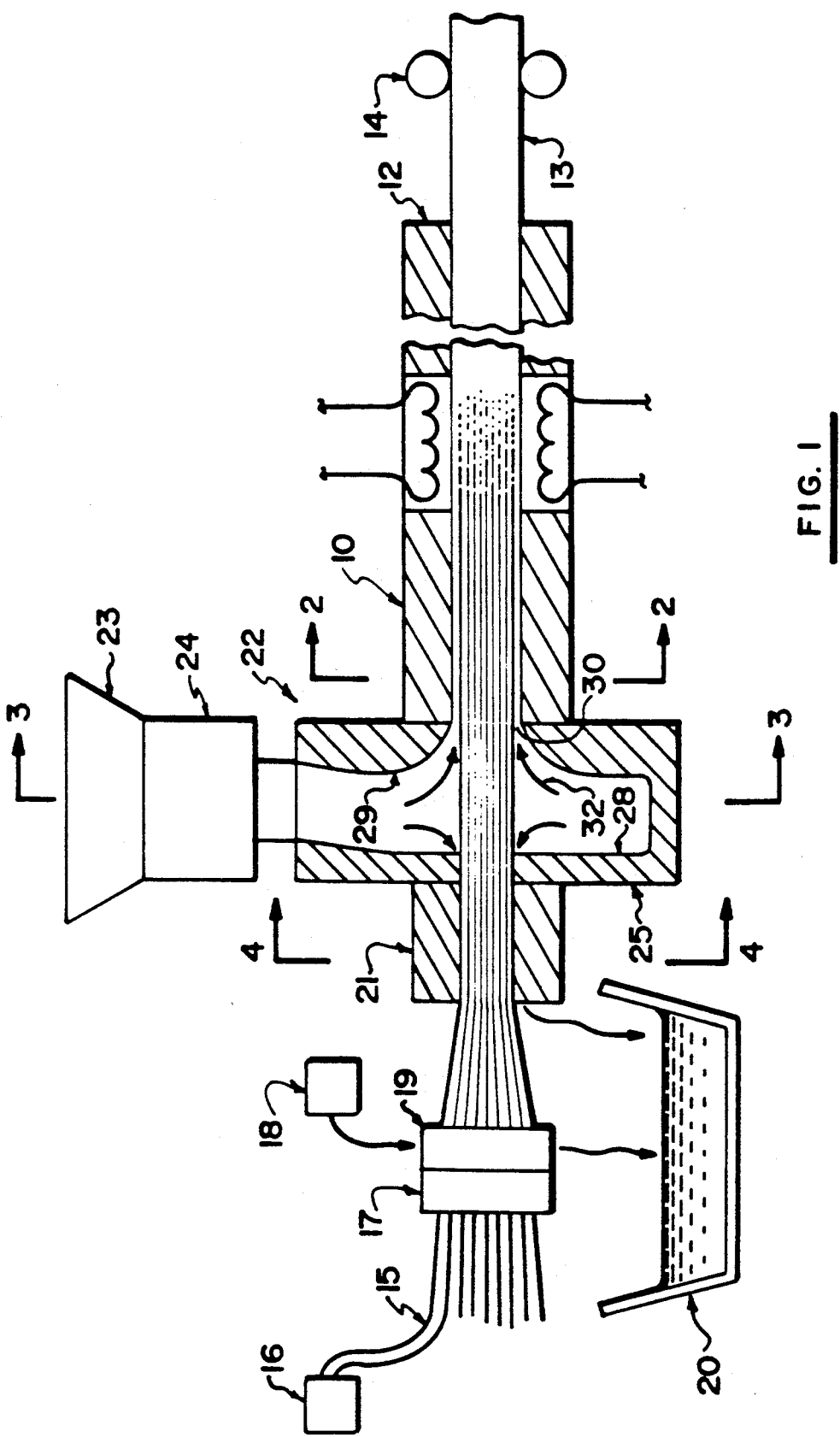
FIG. 1 is a vertical cross-sectional view through a window construction according to the present invention.
Figure 4:
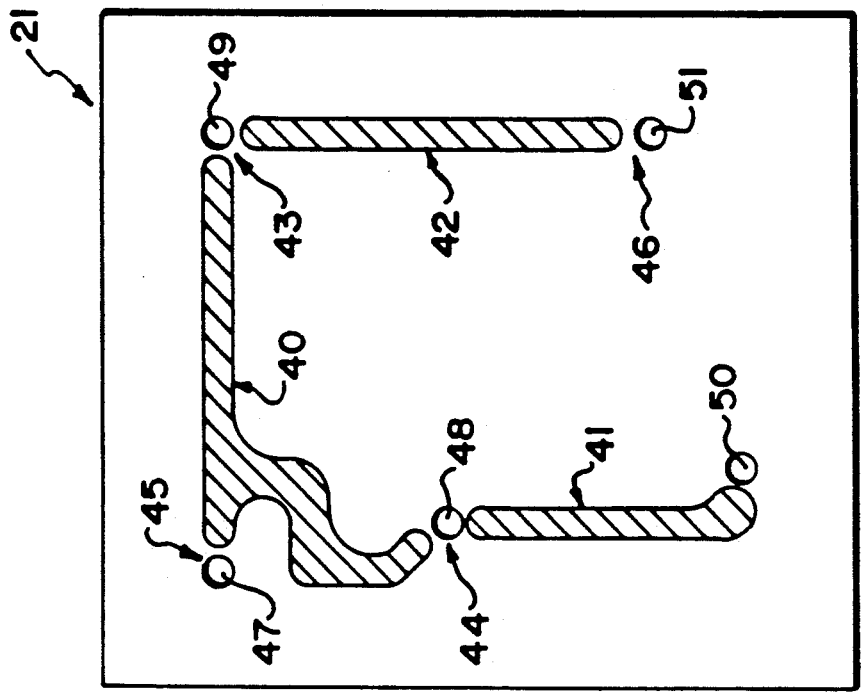
Figure 2:
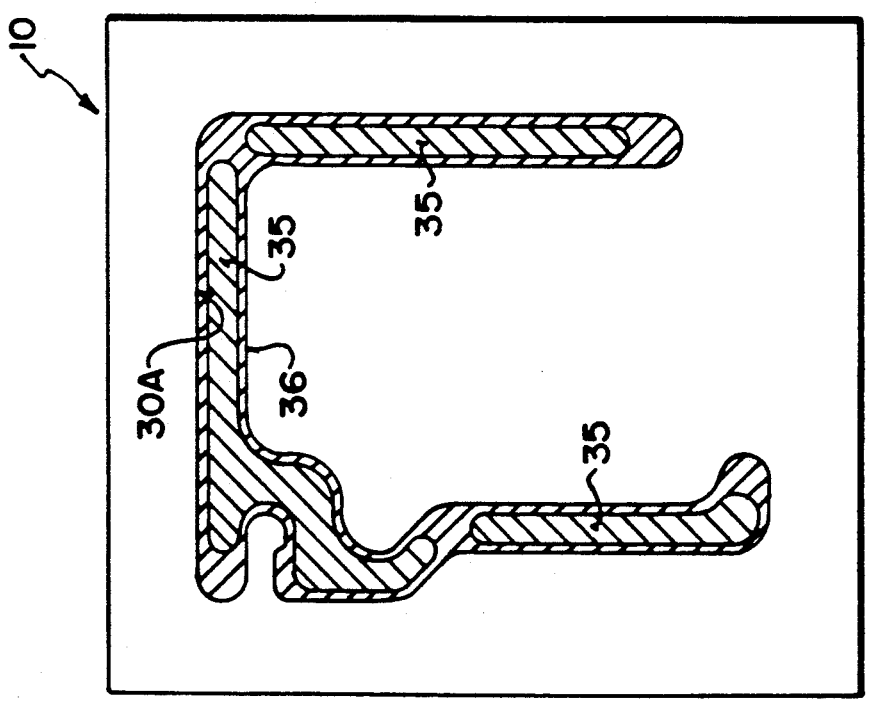
FIG. 2 is a front elevational view of the window of FIG. 1 with the scale exaggerated for convenience of illustration.

The windows illustrated in FIGS. 1 and 2 comprises a sash type window including a sash frame 10 and an outer window frame construction 11. For convenience of illustration the hinge mechanism mounting the sash frame within the outer window frame is omitted and also the operating mechanism for pivoting the sash frame about the hinge is also omitted. The window construction shown is formed of vinyl extrusions but other materials could also be used.

The outer frame 11 is defined by four side portions arranged at right angles and coupled at the four corners to define a rectangular opening for receiving the sash frame. Each of the four sides of the outer window frame is defined by a portion of an extruded profile generally indicated at 12. The profile 12 has an outer surface 13 for resting upon the opening in the wall (not shown) and an inner surface 14 defined in the interior of the window. Between the inner surface 14 and the outer surface 13 is defined a plurality of cells provided by walls 15 providing a reinforced structure having sufficient strength to hold the inner surface 14 rigid. An outer window sill 15 connects to the outer portion of the surface 14 and inclines outwardly therefrom for engaging an outer edge of the sash frame 10. An inwardly projecting section 16 of the outer frame extends vertically inwardly from the inner surface 14 and then provides an abutting surface 17 for engaging an inner surface of the sash frame. The surface 17 carries a weather strip 18. The outer face 19 of the sill portion 15 connects to a brick mold 20 of conventional construction and including an outer flange 21 for connection to the wall. The brick mold across the lower side of the outer frame is modified in shape relative to the sides and the top to define an outwardly projecting sill of conventional construction. A screen 22 provided in a frame 23 is mounted inside the inwardly projecting portion 16. The operating mechanism for the sash projects through the inwardly projecting portion 16 in conventional manner and is not shown for convenience of illustration.

The sash frame 10 similarly comprises four extruded profiles 24, 25, 26 and 27. The side profiles 24 and 26 are of a conventional simple shape. The upper and lower profiles are modified relative to the conventional shape as follows. Referring firstly to the lower profile 27, this provides an upper surface 28 to which is attached a L-shaped inner stop 29 for receiving an edge of an inner pane assembly 30. The stop 29 is screwed to the upper surface 28 by a screw 31 and secured by welding. The outer pane 32 of the inner pane assembly rests against the inner surface of the stop 29. The inner pane 33 of the inner pane assembly engages against a further stop 34 of a conventional type. The stop 34 includes a snap portion 35 for engaging into a recess 36 in the upper surface 28.

A snap portion 35 holds the stop so that an inner edge 37 thereof engages the pane 33. A weather strip or bead 38 is provided on the inner surface so as to provide a seal against the inner pane 33. The outer surface of the profile 27 is indicated at 39 and includes a plurality of step portions 40, 41 and 42 interconnected to the inner surface 28 by connecting walls providing sufficient strength. The outer surface 40 carries a weather strip 41 which engages against the upper surface of the sill portion 15. The vertical end surface of the profile engages against the weather strip 18.

A vertical outer surface 43 defines a front face of the profile and mounts a separate outer pane assembly 44. The outer pane assembly 44 includes a glass pane 45 and a surrounding rim 46 with a flange for engaging against the outer surface 43 of the profile.

The profile is modified relative to the conventional by the provision of a first slot 47 in the vertical wall 43 to allow the passage of air into the interior of the profile. In addition a second slot 48 is provided in an upper wall of the profile just outside the upper wall 28 and directly beneath the space between the outer pane 45 and the outer pane 32 of the inner pane assembly 30.

The profile is further modified by the attachment at the slot 47 of a shroud member 49 having a horizontal upper surface and a vertical surface extending downwardly therefrom. An underside of the shroud member defines an opening 50 through which air can pass into the interior of the shroud member and from the shroud member through the slot 47. A filler nest is provided inside the shroud member to prevent dust from entering with the exterior air.

The upper profile 25 is basically similar to the lower profile in that it includes an inner surface 28, a vertical front surface 43, a weather strip 41, an outer surface 39 and a plurality of connecting walls. The flange 46 surrounding the pane 45 similarly engages against the outer surface 43.

In this case, however, the profile is modified by the addition of an additional profile portion 50 which mounts against the inner surface 28 and extends inwardly therefrom to define a supplementary inner surface 51 similar in shape to the inner surface 28. The additional profile portion 50 snap fits into the recess 36 and includes a similar recess 36A for receiving the stop 34. Thus the additional profile portion 50 reduces the height of the inner pane assembly 30 relative to that of the outer pane 44. In addition the additional profile portion 50 includes a first slot 52 in an outer vertical wall 53 thereof which is thus positioned above the upper edge of the inner pane assembly 30. In addition the additional profile portion includes a slot 54 in an inner vertical wall 55 thereof so that air can pass directly through the additional profile portion from the outer face thereof to the inner face thereof from the channel defined between the inner and outer pane assemblies.

The outer window frame further includes at the upper profile an additional frame portion indicated at 57. The additional frame portion is attached preferably by welding to the lowermost edge of the inwardly projecting portion 16 and projects beyond that portion for abutting against the inner surface 55 of additional profile portion. Thus the portion 57 defines an abutting portion for engaging against the upper profile of the sash frame. The inwardly projecting portion 16 carries the weather strip 18 and in addition the abutting portion 57 carries a second weather strip 58 so that these two weather strips are spaced on respective sides of the slot 54. The abutting portion 57 carries a pair of slots 59 and 60 which are aligned with the slot 54 so the air can pass directly from the additional profile portion 50 through the abutting portion 57 to escape to the interior of the window frame through the slot 60.

Figure 3:
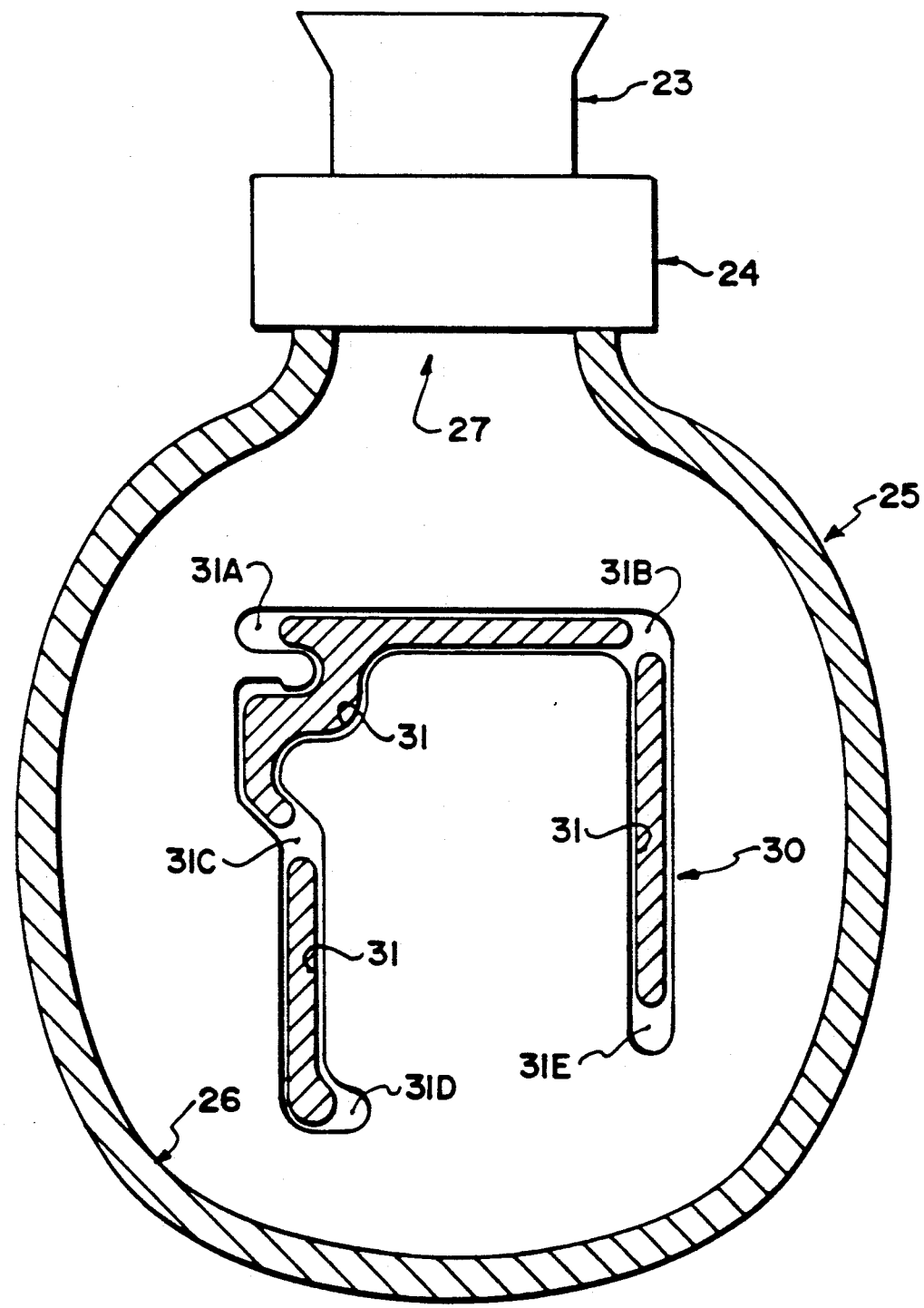
FIG. 3 is a cross-sectional view through the air inlet control unit at the inlet opening of the air at the top of the window.

Mounted on the inner face of the abutting portion 57 is a control unit 62 the construction of which is shown in more detail in FIG. 3.

The inner pane assembly 30 comprises a sealed window unit defined by the inner and outer panes 32 and 33 together with a conventional spacer system and sealing system shown schematically and well known to one skilled in the art. Thus basically there is little heat which escape from the interior of the building through the inner pane assembly but this heat loss is still of a significant nature and normally reduces the insulation value of a dual pane seal window unit to a value significantly lower than that of the surrounding wall construction. Some heat therefore passes through the outer pane 32 and into the channel defined between the outer pane 32 and the outer pane assembly 44.

The outer pane assembly comprises a single pane carried by the surrounding flange 46 which simply presses into place inside the four profiles defined in the sash frame and can be latched in place by a simple turn clip 63. This allows the outer pane to be removed for cleaning if required.

The spacing between the outer pane 45 and the outer pane of the inner pane assembly is arranged to be of the order of one-half inch thus defining a channel therebetween which is of constant cross-section with the cross-section being substantially rectangular.

The slots 47 and 52 as best shown in FIG. 2 extend substantially along the full length of the respective profile and terminate adjacent the side edges of the window. In order to avoid damaging reduction in strength and to provide sufficient bridging portions, the slots terminate a short distance inside the sides of the sash frame and may include bridging struts at space along the length of the slots. Basically however the slots are rectangular in shape and define a cross-section substantially equal to the cross-section of the channel so that there is little or no resistance to air flow defined by the slots. The slot 47 at the bottom the frame therefore allows air to enter freely into the channel substantially without turbulence as the air enters. The parallel walls of the channel which are free from obstruction to air movement so the channel is defined wholly by the inner smooth surfaces of the panes allows the air to move in laminar flow through the channel from the bottom edge of the sash frame up to the slot 52.

As the air moves in laminar flow, there is little or no mixing of the air and it remains in smooth condition so that no air molecules move from a position in contact with the outer surface of the pane 32 toward or to the pane 45. The heat that is therefore present at the pane 32 is carried in the laminar air flow and effectively is prevented from transferring to the pane 45. Substantially all heat, except for a very low level of radiated heat, is therefore picked up from the pane 32 and carried up to the top of the channel and through the slots 52, 54, 59 and 60 into the control unit 62.

This air flow therefore substantially prevents the transfer of heat through the window pane thus significantly increasing the insulation value to a level of the order of R-14 which is approaching the insulation value available in the surrounding wall construction.

The control unit 62 comprises an upper wall 63 and a lower wall 64 which are welded at an end face 65A onto the outer surface of the abutting portion. The walls curve in a direction upwardly and outwardly to define a nozzle which ejects the air in a direction upwardly and outwardly toward the ceiling away from the inner surface of the window.

The control unit includes a manually operable damper 65 which can be rotated from the closed position shown which effectively prevents air flow to an open position at right angles to the closed portion to allow the maximum air flow through the slots and thus through the channel. The manually operable damper 65 is operated from one end of the control unit by a lever (not shown).

A back draft damper 66 comprises simply a flat member hinged at an upper edge 67 and normally held open by the forward movement of the air through the slot 60. In the event however that air tends to move in a rearward direction that is from the interior of the building toward the exterior, the flap 66 closes against an abutment 68 so the air is prevented from moving in that rearward direction. In this way air from the interior is prevented from entering the channel defined between the panes. Should such air enter into this area, the warm moist air from the interior could condense on the inner surface of the outer pane causing frosting which is of course unacceptable in a high technology window construction. The intention is therefore at all times that air flow will continue from the exterior through the channel to the interior to provide both of the proper ventilation effect, using prewarmed air for comfort, and also the high insulation level. In the event that the building user wishes to close off the ventilation in a particular area, the damper 65 of the associated window can be actuated to half the air flow.

The window unit shown in FIGS. 1 and 2 is mounted in the building which includes a wall indicated at 70 having a fan assembly 71 for extracting air from the building through a duct 72 for ejection from the building. In this way the building interior is normally maintained at a slightly lower pressure than the exterior atmospheric pressure so there is a tendency for air to flow into the building from the exterior. The whole of the building is maintained at this low pressure so that each of the separate windows of the building can operate in the manner described above. Normally therefore each control unit will be maintained in the open position so that the low pressure conditions throughout the building tend to draw the air into the building through each of the window units. This movement of air through each of the window units provides ventilation to each of the rooms and it has been found that in one example of an arrangement according to the present invention five liters per second of fresh air can be drawn through the window unit which is sufficient to accommodate the ventilation requirements currently being put forward as a requirement for new buildings. Should however the fan fail or unusual wind conditions prevail then the reverse flow of air is prevented by the back draft damper 66.

In an alternative arrangement (not shown) the damper 65 can be controlled by a humidity sensing device which can thus control the amount of ventilation air drawn into the building through the particular window unit concerned in dependence upon the humidity level within the room with which the window unit is associated.

While other directions of flow are possible, the air flow from the bottom of the window up to the top of the window is selected so that the control unit 62 is mounted at the top of the window and can more readily direct the air upwardly toward the ceiling where it can mix with warmer air before falling and encountering the occupants of the room. In this way undesirable drafts are prevented.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A window construction comprising a window frame for mounting in a window opening of a building so as to separate the exterior of the building from the interior of the building, an inner window pane assembly mounted in the window frame and extending across an area of the window frame, an outer window pane assembly mounted in the window so as to cover substantially the same area of the window frame and extending parallel to the inner window frame assembly so as to define a channel of substantially constant cross-section between an outer surface of the inner pane assembly of an inner surface of the outer pane assembly, first opening means along one edge of the window frame allowing communication of air from the exterior of the building into the channel, second opening means along an edge of the window frame opposed to said one edge allowing communication of air from the channel into the interior of the building, the first and second opening means being shaped, dimensioned and located relative to the channel so as to generate a substantially laminar flow of air through the channel so as to carry heat escaping from the outer surface of the inner pane assembly through the channel to the interior of the building while substantially preventing the heat from reaching the outer pane assembly said window frame including an outer window frame having a top rail, a bottom rail and two vertical side rails and an inner sash frame having a top rail, a bottom rail and two vertical side rails, the sash frame being mounted for movement within the outer window frame for opening of the window from a closed position in which said rails of the outer window frame engage said rails of the sash frame to an open position, said first and second opening means being provided in the sash frame, said sash frame further including an additional profile portion extending across an under side of the upper rail thereof having channel means therein defining a part of said second opening means, the outer frame including an abutment portion for engaging the sash frame at the additional profile portion, the abutment portion having an opening therethrough cooperating with the channel means of the additional profile portion for allowing passage of air from the second opening means through the abutment portion into the interior of the building.

2. The invention according to claim 1 wherein the first opening means is arranged at a bottom edge of the window frame and the second opening means is arranged at the top edge of the window frame.

3. The invention according to claim including airflow control means mounted on the frame at the second opening means for controlling the flow of air from the channel into the interior of the building.

4. The invention according to claim 3 wherein the control means includes a damper operable for increasing and decreasing the airflow through the channel.

5. The invention according to claim 3 wherein the control unit includes a back draft damper for preventing reverse movement of air through the channel.

6. The invention according to claim 3 wherein the control unit includes a guide nozzle for directing air inwardly and upwardly from the second opening means, the second opening means being arranged at a top edge of the window such that the air is directed from the top edge toward a ceiling of the building.

7. The invention according to claim 1 wherein said opening in the abutment portion extends substantially along the full length of the abutment portion, there being provided a first weather strip means arranged on an upper side of said opening and second weather strip means arranged on an under side of said opening.

8. The invention according to claim 2 wherein there is provided a shroud member along the first opening means defining a protective surface covering the second opening means and allowing entry of air under the respective surface into the first opening means.

9. The invention according to claim 8 wherein the shroud member includes a filter.

10. The invention according to claim 1 wherein the channel has a width of the order of 0.5 inches.

11. The invention according to claim 10 wherein the first and second opening means are arranged to have a cross-section of opening substantially equal to the cross-section of the channel.

12. The invention according to claim 1 wherein the channel is defined by the inner surface of the outer pane assembly and the outer surface of the inner pan assembly and is open therebetween so as to be free from any impediments to free flow of air through the channel.

13. The invention according to claim 1 wherein the inner pane assembly comprises a sealed window unit comprising two panes of glass and wherein the outer pane assembly comprises a single pane.

14. The invention according to claim 1 wherein the first opening means includes a first slot-shaped opening in a vertical wall of the window frame allowing the exterior air to enter into the interior of the window frame and a second slot-shaped opening in a horizontal wall of the window frame so that air can pass from the interior of the window frame vertically upwardly into a space defined between the outer pane assembly and the inner pane assembly and wherein the second opening means comprises a slot-shaped opening in a vertical wall of the window frame positioned beyond an edge of the inner pane assembly such that the air escapes from the channel by turning at right angles from the channel into the opening in the vertical wall and then through the window frame to the interior.

15. A method of providing ventilation into the interior of a building comprising extracting air from the building so as to define within the building a reduced pressure relative to the exterior of the building, providing a plurality of window units each comprising a window frame for mounting in a window opening of a building so as to separate the exterior of the building from the interior of the building, an inner window pane assembly mounted in the window frame and extending across an area of the window frame, an outer window pane assembly mounted in the window so as to cover substantially the same area of the window frame and extending parallel to the inner window frame assembly so as to define a channel of substantially constant cross-section between an outer surface of the inner pane assembly and an inner surface of the outer pane assembly, first opening means along one edge of the window frame allowing communication of air from the exterior of the building into the channel, second opening means along an edge of the window frame opposed to said one edge allowing communication of air from the channel into the interior of the building, generating a substantially laminar flow of air through the channel so as to carry heat escaping from the outer surface of the inner pane assembly through the channel, while substantially preventing the heat from reaching the outer pane assembly, to the interior of the building such that each separate window unit provides a separate flow of exterior air into the building, the exterior air being warmed by the escape of heat through the inner pane assembly.

16. The invention according to claim 15 wherein the first opening means is arranged at a bottom edge of the window frame and the second opening means is arranged at the top edge of the window frame.

17. The invention according to claim 15 including airflow control means mounted on the frame at the second opening means for controlling the flow of air from the channel into the interior of the building.

18. The invention according to claim 17 wherein the control means includes a damper operable for increasing and decreasing the airflow through the channel.

19. The invention according to claim 17 wherein the control unit includes a back draft damper for preventing reverse movement of air through the channel.

20. The invention according to claim 17 wherein the control unit includes a guide nozzle for directing air inwardly and upwardly from the second opening means, the second opening means being arranged at a top edge of the window such that the air is directed from the top edge toward a ceiling of the building.

* * * * *